United States Patent

Kume et al.

[11] Patent Number: 5,865,015
[45] Date of Patent: Feb. 2, 1999

[54] CUTTING DEVICE IN FILLING AND PACKAGING APPARATUS

[75] Inventors: Satoshi Kume; Hiroshi Katayama; Shigenori Tawa; Michio Ueda, all of Tokushima-ken, Japan

[73] Assignee: Shikoku Kakoki Co., Ltd., Tokushima-ken, Japan

[21] Appl. No.: 965,889

[22] Filed: Nov. 7, 1997

[30] Foreign Application Priority Data

Nov. 28, 1996 [JP] Japan .................................... 8-317299

[51] Int. Cl.$^6$ ........................................................ B65B 9/12
[52] U.S. Cl. .................................. 53/552; 53/75; 53/550
[58] Field of Search ........................... 156/515; 493/203; 53/75, 373.4, 550, 552, 553

[56] References Cited

U.S. PATENT DOCUMENTS

| | | | |
|---|---|---|---|
| 3,082,586 | 3/1963 | Schneider et al. | 53/552 |
| 3,172,245 | 3/1965 | Aquarius et al. | 53/552 |
| 3,449,888 | 6/1969 | Gausman . | |
| 3,574,039 | 4/1971 | Fehr et al. | 493/203 X |
| 3,925,139 | 12/1975 | Simmons | 53/552 X |
| 3,940,305 | 2/1976 | Stenberg | 53/553 X |
| 4,353,196 | 10/1982 | Beer et al. | 53/552 X |
| 4,546,596 | 10/1985 | Cherney | 53/551 X |
| 4,566,249 | 1/1986 | Schwerdtel et al. | 53/552 X |
| 4,713,047 | 12/1987 | Klinkel | 493/34 |
| 4,759,170 | 7/1988 | Sawa et al. | 53/551 |
| 5,063,727 | 11/1991 | Patelli | 53/552 |
| 5,284,002 | 2/1994 | Fowler et al. | 53/552 X |
| 5,400,565 | 3/1995 | Terminella et al. | 53/552 X |

FOREIGN PATENT DOCUMENTS

| | | |
|---|---|---|
| 192605 | 8/1986 | European Pat. Off. . |
| 58-193206 | 11/1983 | Japan . |
| 1-23366 | 5/1989 | Japan . |
| 1011359 | 11/1965 | United Kingdom . |
| 86/04559 | 8/1986 | WIPO . |

Primary Examiner—Daniel B. Moon
Attorney, Agent, or Firm—Beveridge, DeGrandi, Weilacher & Young, LLP

[57] ABSTRACT

A cutting device is provided for securing the cutting of the lateral sealed parts of a tubular packaging material web in the filling and packing machine of a filling and packaging apparatus that manufactures package containers each have a rectangular cross section and are filled with a fluid such as juice, etc. The cutting device includes the tubular packaging material web which is filled with a fluid, a pair of seal bars for laterally sealing the packaging material web, a cutter for cutting the packing material web at sealed parts thereof by a length corresponding to one container, fluid (such as air) pressure serving as a means for giving a biasing force to the cutter in a direction to retreat the cutter, and a pressure sensor capable of detecting a change of the fluid pressure in the supply passage.

9 Claims, 5 Drawing Sheets

CUTTING DEVICE IN FILLING AND PACKAGING APPARATUS

BACKGROUND OF THE INVENTION

1. Field of the Invention

The present invention relates to a cutting device used in a lateral sealing process, etc. in a filling and packaging apparatus for manufacturing package containers each having a rectangular shape, etc. in cross section and filled with fluid such as juice, etc. and particularly to a cutting device provided with a hydraulic cylinder.

2. Prior Art

There is known a conventional filling and packaging apparatus comprising a rewinder for supporting a web serving as a packing material (hereinafter referred to simply as packaging material web) in a rolled state, a winding apparatus for winding the web in order from the rewinder, a tube-forming apparatus for forming the wound web in a tubular shape after sterilizing it, a fluid supply pipe for filling fluid in the packaging material web which was formed in the tubular shape, and a container-forming apparatus for laterally sealing the web and cutting sealed parts of the web to continuously form pillow-like containers each having a rectangular shape in cross section while downwardly supplying the tube filled with the fluid by the length corresponding to one container, and a container shaping apparatus for bending each end part of the pillow-like containers which are separated into individual ones to shape each pillow-like container in a parallelepiped container to be finally obtained (as disclosed in JP-B 1-23366 and JP-A 58-193206)).

The container-forming apparatus sandwiches the tube filled with the fluid by lengths each corresponding to one container for laterally sealing it, and cuts the sealed parts (intermediate parts between the sealed areas) wherein a press is provided for producing sealing pressure between a pair of lateral seal bars and two pairs of lateral seal bars movable vertically alternately, and wherein a pair of lateral seal bars comprise a heating mechanism called as inductors and a heating bar provided between the inductors and having a portion for receiving a cutter, and a cutting bar which extends laterally from the center thereof and provided with a flat cutter which advances and retreats (see FIG. 2). As a conventional cutting device as the cutting bar, it is known that the advance of the cutter is made by oil pressure, and a retreat of the cutter is made by a spring. Such a conventional cutting device will be now described more in detail.

A cutter retreat cylinder is disposed at the central back side of the cutter, and the cylinder has a piston integrated with a piston rod mounted on the central rear end part of the cutter, and a spring which is coaxially provided with the piston for always giving a biasing force (about 35 Kgf) in a direction of retreating the cutter so that the piston rod is positioned in a retreating position. There are two cutter advance hydraulic cylinders provided at the right and left sides of the cutter retreat cylinder and disposed at both rear end portions of the cutter, and pistons provided in the hydraulic cylinders and having piston rods integrated with the hydraulic cylinders capable of pressing right and left back end parts of the cutter, oil pressure chambers respectively communicating with oil-supply pipes, wherein when the tubular packaging material is cut, oil is supplied from the oil-supply pipes to the oil pressure chambers to advance the piston rods with a force which is greater than a biasing force of the spring, thereby pressing the cutter to cut the lateral sealed parts of the tubular packaging material web. After the tubular packaging material web is cut, the supply of oil from the oil-supply pipes is stopped so that no oil under pressure is supplied to the oil pressure chambers, and hence the cutter is retreated owing to the biasing force of the spring so as to be accommodated into the cutting bars.

In such a lateral sealing apparatus having a complex construction, the spring is excellent as a means for retreating the piston to which a cutter is attached in view of space and cost thereof, and in actual circumstances there has been no problem for practically using the spring so far. The spring employed by this lateral sealing apparatus shows a durability as it is designed, and it is enough to replace the spring with a new one once every couple of months.

The above-mentioned conventional press comprises a stationary engaging member having an upward engaging recess and a movable engaging member having a downward engaging projection engaging with the engaging recess of the stationary engaging member, wherein the engaging members are respectively provided at right and left sides of each seal bar. The movable engaging member is attached to the piston rods of the hydraulic cylinder, and the piston rod is retreated in a state where the movable engaging member pivotally moves to engage with the stationary engaging member so that a sufficient sealing pressure of about 700 Kgf is produced between the seal bars.

The production of sealing pressure in the press owing to the retreat of the piston rod to which the movable engaging member is attached is performed by the oil under pressure of the hydraulic cylinder provided in the press, while the release of the sealing pressure and the advance of the piston rod is performed by the biasing force (about 30 Kgf) of a plurality of springs which are disposed coaxially in the cylinder and have different diameters at the same time when the oil pressure is released (e.g., see FIG. 12 of JP-B 1-23366).

An idea to employ a biasing force other than the biasing force of the spring as a means for advancing the piston rod to which the movable engaging member is attached has not been hitherto considered in view of a space and cost of the lateral sealing apparatus having such a complex construction, and a need for such sealing apparatus has not been demanded so far. The spring provided in the hydraulic cylinder shows durability as designed, and is sufficient to be replaced with another every couple of months.

In a conventional method of retreating the cutter owing to the biasing force of the spring, the cutter cannot be retreated after cutting the tubular-shaped packaging material web when the spring is broken, so that the tip end of the cutter to be accommodated in the cutting bars always protrude from the cutting bars, causing a possibility that a non-sealed part of the web is damaged inadvertently.

When the spring is broken, the cutter cannot be retreated after cutting the web, and the tip end of the cutter to be accommodated in the cutting bars always protrudes from the cutting bars so that energy generated in the inductor of the heating bars is taken away by the cutter, whereby an aluminum foil layer of the packaging material web is insufficiently heated to insufficiently melt a resin layer so as to make the lateral sealing incomplete.

As a result, a package container in which the web is broken or a package container in which incomplete lateral sealing is performed is manufactured, which causes a problem that a filler such as juice, etc. is leaked or leached out from the package container. If such leaking or leaching out of the filler such as juice, etc. from the package container is visually recognized, it can be checked in a manufacturing process, but if such leaking is too small to be visually recognized, it is very troublesome. The reason is that in distribution channels of the germ-free filling and package container, such leaking and leaching out of juice, etc. from the sealed parts causes a serious problem of propagating the mold, etc. and contamination by a microorganism. In a state where the tip end of the cutter to be accommodated in the cutting bars always protrudes from the cutting bars, the unsealed part of the web is inadvertently damaged or the cutter contacts the filler such as juice, etc. so that the filler such as juice, etc. in the package container is contaminated in the microorganic point of view, and then the lateral sealing is performed at the damaged part. As a result, although the external appearance of the package container is normal, there is a likelihood of occurrence of fatal matter such as propagation of a harmful microorganism in the package container for the germ-free filling and package container.

Since the spring is provided in the cylinder, the damaging state of the spring cannot be seen from the outside. Even if the spring is damaged during the manufacture of the package container, the manufacture of the package container continues while the spring is damaged, and hence the damage of the spring is found out when the apparatus are checked upon completion of a day's manufacture so that all package containers manufactured at the same date must be scrapped. To avoid such a situation, it is necessary to replace a spring with another earlier than that designed date, which incurs a troublesome labor to regularly replace the spring and also the increase of running cost involved in the replacement of the spring.

SUMMARY OF THE INVENTION

It is an object of the invention to solve the above problems caused by the damage of the spring which occurs when cutting the lateral sealed parts in the filling and packaging apparatus, and it is another object to provide a cutting device securing the cutting of the lateral sealed parts in the filling and packaging apparatus for an extended period of time. These objects were found out in the course of solving the problem of damage of the spring in a press which has been conventionally employed in the filling and packaging apparatus.

The inventors of the application have developed a superhigh-speed filling and packaging apparatus capable of manufacturing containers at rate far in excess of 6000 pieces per hour which has been made so far, namely, more than 8000 pieces of containers per hour (as disclosed in Japanese Patent Application No. 8-244707). If the lateral sealing is performed at high speed using a conventional press in such a superhigh-speed filling and packaging apparatus, a hydraulic cylinder having springs disposed therein is swung at a higher speed than a conventional filling and packaging apparatus. As a result, it is revealed that sometimes there occurs a problem that the springs are damaged in a very short time and the parts where the engaging parts contact one another are frequently damaged, which has been never considered in the press of the conventional filling and packaging apparatus.

Accordingly, the inventors studied a system to utilize a hydraulic cylinder instead of springs to cope with the problem of damage of the spring which occurs in the press during the lateral sealing process in a superhigh-speed filling and packaging apparatus, namely, a system for advancing the movable engaging member using fluid pressure. The inventors completed the invention of a press utilizing hydraulic cylinders capable of securing the application of pressure in the lateral sealing process for an extended period of time, of omitting a troublesome labor for regularly replacing the springs, of dispensing with any running cost involved in replacement of the springs, and of confirming the detection of inferior sealing of the container quickly even if it occurs (as disclosed in Japanese Patent Application No. 8-314650).

The inventors further studied the application of the knowledge of utilization of a hydraulic cylinder in the press instead of springs to a cutting device in the lateral sealing and cutting process. In the cutting device having such a complex construction, a piping system for avoiding other ascending seal bars like in the case of the press is very complex as a means for giving a biasing force in a direction to retreat the piston to which a cutter is attached, but the inventors have confirmed that the problem in case that the springs are used when cutting the sealed parts in the lateral sealing process of the filling and packaging apparatus has been solved by utilizing oil pressure instead of the springs.

That is, it is an aspect of the invention to provide a cutting device comprising a tubular packaging material web which is filled with a fluid, a pair of seal bars for laterally sealing the packaging material web, a cutter for cutting the packing material web at sealed parts thereof by a length corresponding to one container, and fluid pressure such as air serving as a means for giving a biasing force to the cutter in a direction to retreat the cutter, and a pressure sensor capable of detecting a change of pressure of the fluid such as air in the fluid supply passage.

It is an another aspect of the invention to provide a cutting device comprising a tubular packaging material web which is filled with fluid, a pair of seal bars for laterally sealing the packaging material web, a cutter provided in one of the seal bars to be freely advanced or retreated for cutting the packing material web at sealed parts thereof by a length corresponding to one container, a piston disposed at a central back side of the cutter and integrated with a piston rod mounted on a central rear end part of the cutter, a pneumatic cylinder having a pressure chamber provided therein for communicating with an air supply pipe, another piston disposed at a back side of the cutter and arranged at the right and left sides of the pneumatic cylinder, and integrated with another piston rod capable of pressing right and left rear ends of the cutter, a hydraulic cylinder having an oil pressure chamber provided therein for communicating with an oil supply pipe, and a pressure sensor capable of detecting a change of pressure in a passage for supplying air to the air supply pipe.

It is still another aspect of the invention to provide a filling and packaging apparatus provided with the cutting device of the first and second aspects of the invention.

PREFERRED EMBODIMENT OF THE INVENTION

A cutting device of the present invention will be now described with reference to the attached drawings. However, the cutting device is not limited to the embodiment set forth in the attached drawings.

A filling and packaging apparatus to which the cutting device is applied comprises, for example, a rewinder for supporting a packaging material web in a rolled state, a winding apparatus for winding the web in order from the rewinder, a tube-forming apparatus for forming the wound web in a tubular shape after sterilizing it, a means for filling a fluid in the packaging material web which is formed in the tubular shape, and a lateral sealing apparatus for laterally sealing the web and cutting sealed parts of the web to continuously form pillow-like containers while downwardly supplying the tube filled with the fluid by the length corresponding to one container, and a container shaping apparatus for bending the end part of each separated pillow-like container to shape each pillow-like container in a parallelepiped container to be finally obtained.

Figure 1:
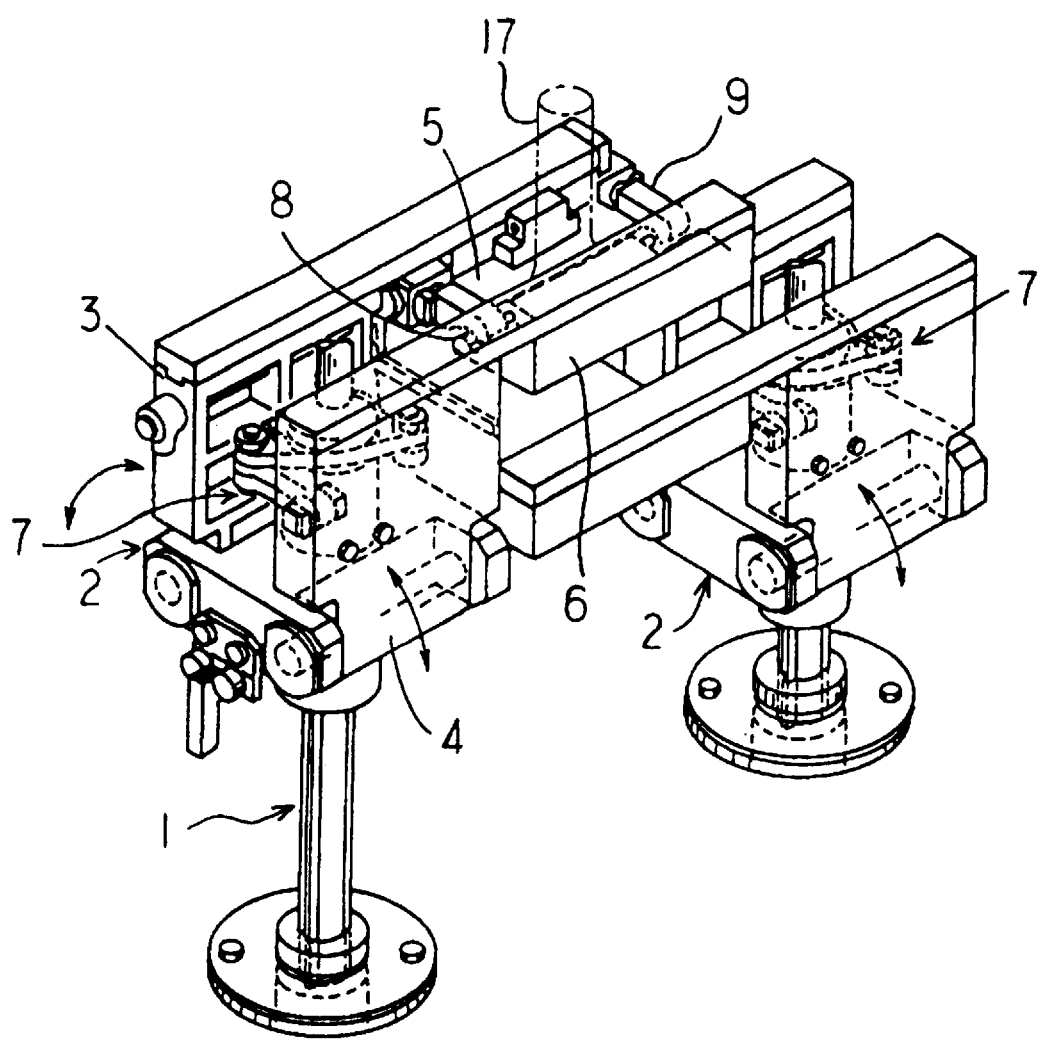
FIG. 1 is a perspective view of a lateral sealing apparatus.
Figure 2:
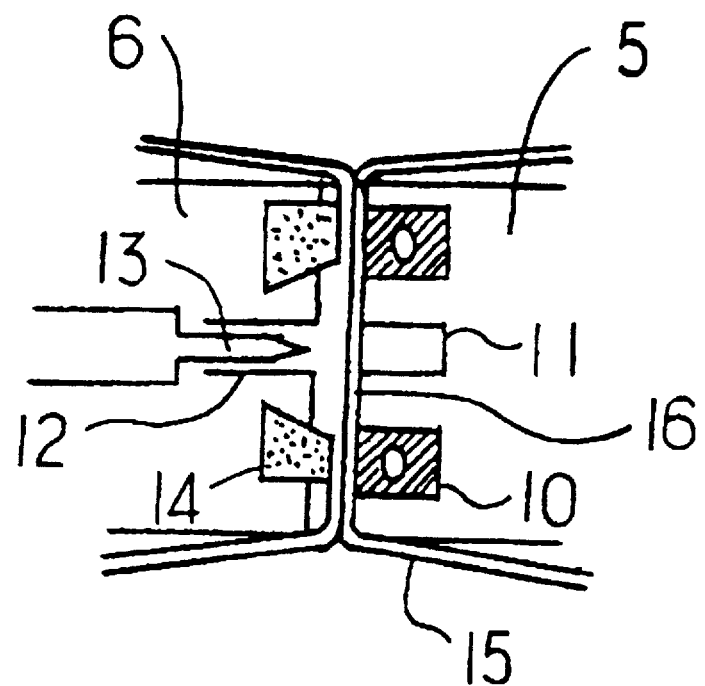
FIG. 2 is a schematic longitudinal cross-sectional view of a cutting device.

As the lateral sealing apparatus, it is possible to employ the one as disclosed in JP-B 1-12366, which comprises, as shown in FIG. 1, vertical rods 1 which freely move upward and downward and turn reversibly, movable frames 2 which are attached to the vertical rods 1 and move upward and downward together with the vertical rods 1, a pair of front and rear swing arms 3 and 4 which are respectively supported by the movable frames 2 so as to pivotally move about a pair of horizontal axes parallel to each other at the lower portions thereof, a pair of seal bars 5 and 6 which are respectively fixed to the upper portions of the swing arms 3 and 4 to oppose each other, arm-closing devices 7 which pivotally move the swing arms 3 and 4 between a closed position where the seal bars 5 and 6 move toward each other and an open position where the seal bars 5 and 6 move away from each other, stationary engaging members 8 which are respectively provided at both sides of the seal bar 6 and have respectively upward engaging recess, and movable engaging members 9 which are respectively provided at both sides of the seal bar 5 and having downward engaging projection which are engaged with the engaging recess of the stationary engaging members 8, and a press for producing sealing pressure between the seal bars 5 and 6 when the swing arms 3 and 4 are pulled toward each other. As shown in FIG. 2, a heating mechanism which is called as inductors 10 and a cutter receiver 11 disposed between the inductors are respectively provided at one seal bar 5, while a cutter accommodation part 12 extending laterally and a flat cutter 13 in the cutter accommodation part 12, and pressure receiving members 14 disposed over and under the flat cutter 13 to enhance sealing intensity are respectively provided at the center of the other seal bars 6, wherein each sealed part 16 of a packaging material web 15 is to be cut.

Two movable frames 2 synchronously move upward and downward alternately in a different direction with a given stroke. That is, when one movable frame 2 moves upward, the other movable frame 2 moves downward. When the movable frame 2 is located at the upper limit position of the ascending stroke, the seal bars 5 and 6 mutually close so that a tube 17 is forcibly pressed and sealed with a given width in a lateral cross-section. When the seal bars 5 and 6 descend together with the movable frame 2 while they press the tube 17, the tube 17 is fed by the length corresponding to one container. When the movable frame 2 reaches the lower limit position, the cutting device operates to cut the tube 17 at the central part 16 within the sealing width (intermediate part between the sealing areas). After the tube 17 is cut, the seal bars 5 and 6 open to release the tube 17 so that a pillow-like container is separated from other parts of the tube 17 by the length corresponding to one container at the lower end of the tube 17.

Figure 3:
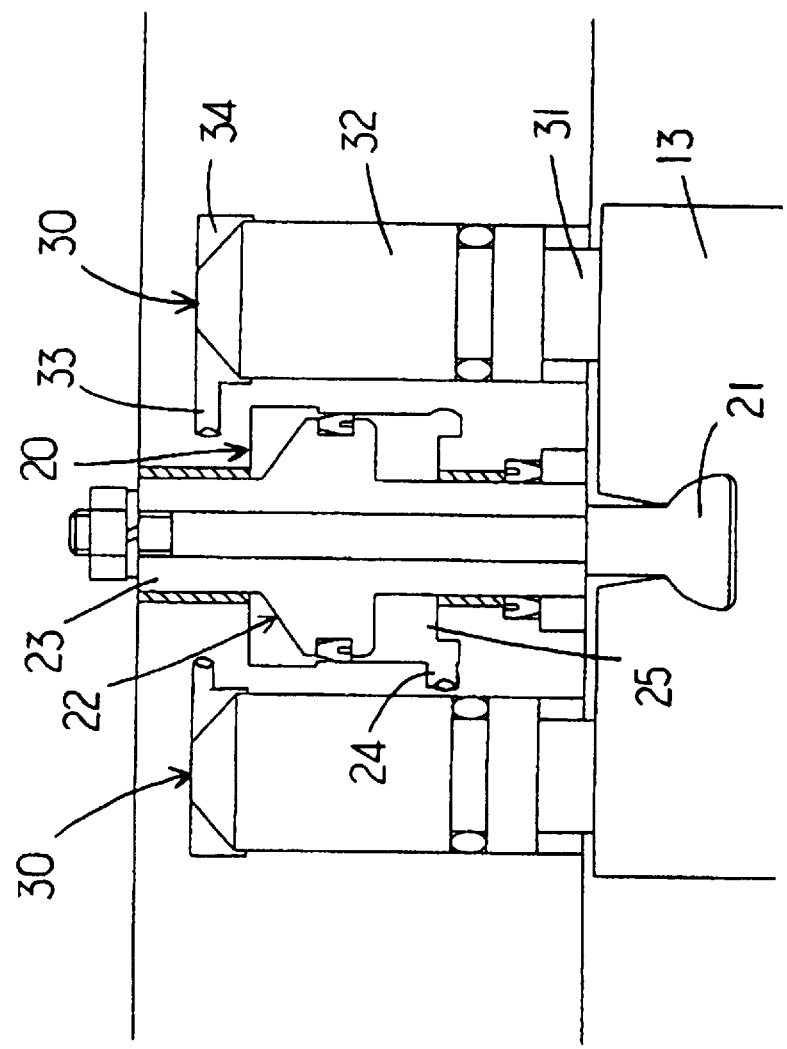
FIG. 3 is a cross-sectional plan view showing a part of the cutting device according to the present invention.
Figure 4:
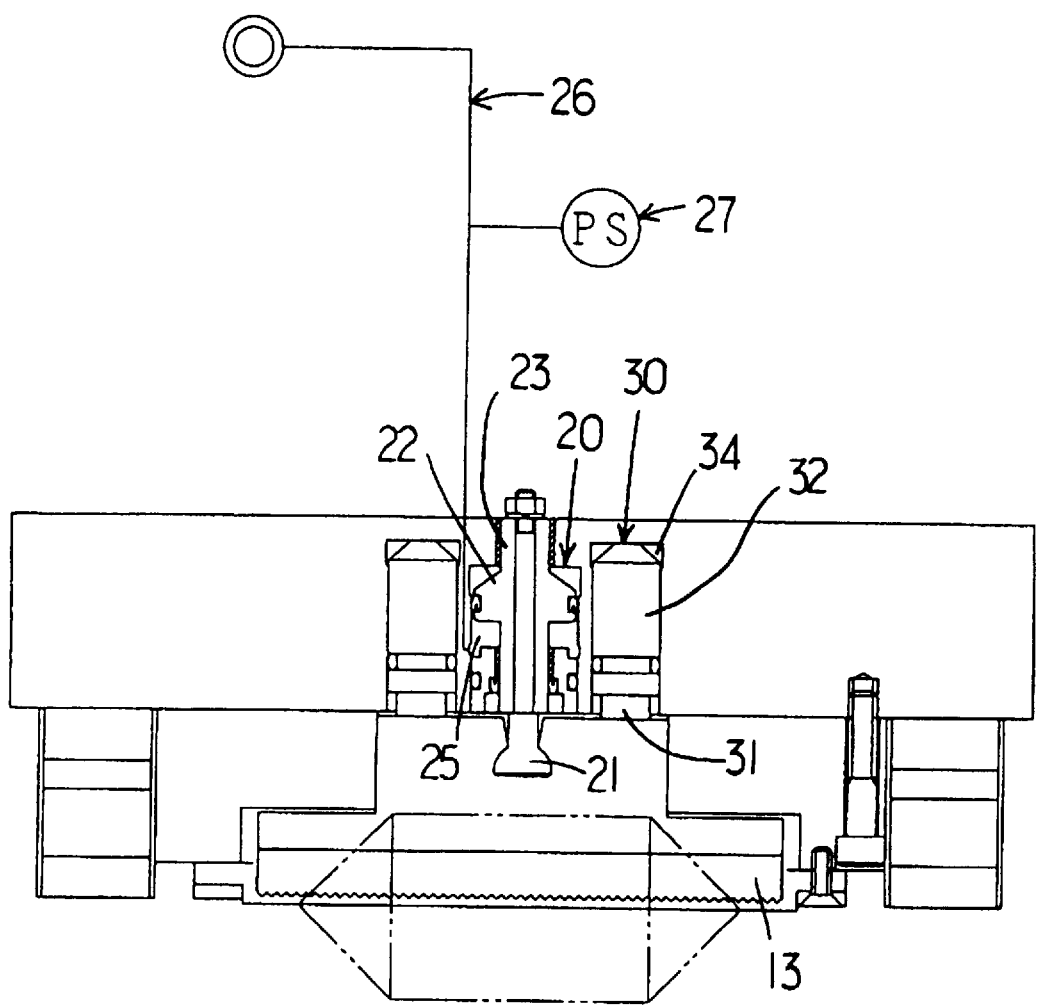
FIG. 4 is a lateral cross-sectional view of the cutting device according to the present invention.

Next, the cutting device will be now described with reference to FIGS. 2 to 5. The flat cutter 13 is accommodated in the laterally extended cutter accommodation part 12 provided at the center of the seal bar 6 in a direction of the thickness thereof (vertical direction in FIG. 2) so as to be advanced to or retreated from the seal bar 6. As shown in FIGS. 3 and 4, a pneumatic cylinder 20 for retracting the cutter is disposed at the central rear portion of the cutter 13. The pneumatic cylinder 20 includes a piston rod 21 which is mounted on the central rear end portion of the cutter 13 and integrally provided therewith, a piston 23 having a large diameter part 22 at the central portion thereof in the longitudinal direction and a pressure chamber 25 provided therein for communicating with an air supply pipe 24. Air is always supplied to the pressure chamber 25 through the air supply pipe 24 so that a biasing force is always applied in a direction to retreat the piston rod 21, namely, in a direction to retreat the cutter.

Figure 5:
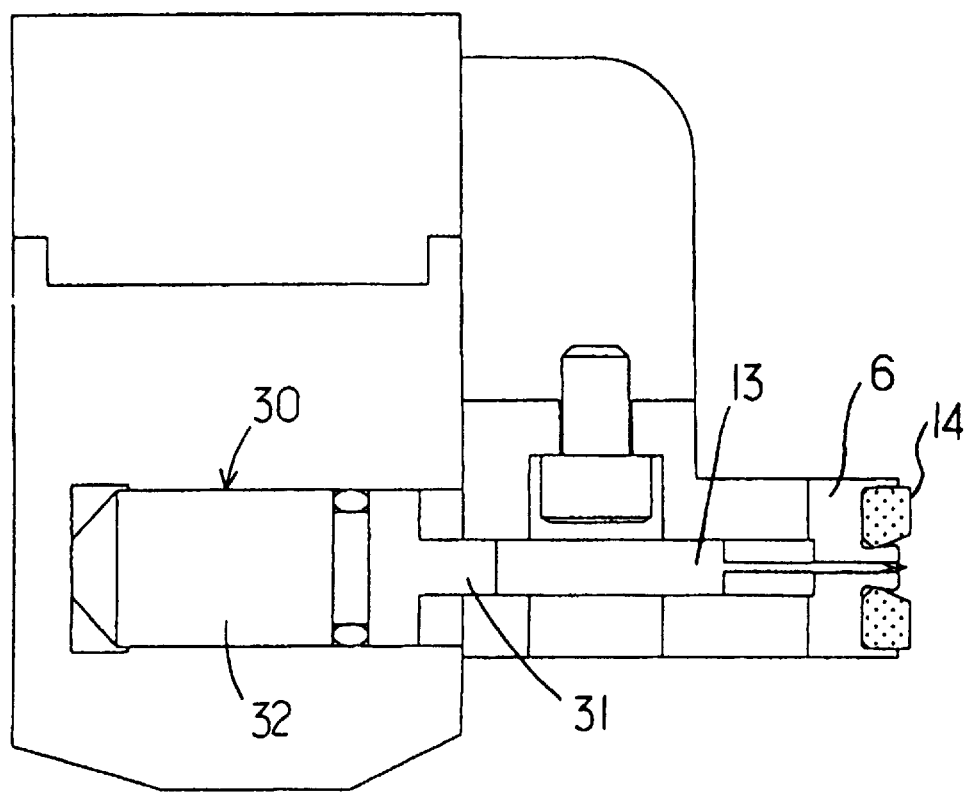
FIG. 5 is a longitudinal cross-sectional view of the cutting device according to the present invention.

Next, as shown in FIGS. 3 to 5, two hydraulic cylinders 30 for advancing the cutter 13 are disposed at the back side of the cutter 13 and at right and left sides of the pneumatic cylinder 20. Each of the hydraulic cylinders 30 has a piston 32 integrated with a piston rod 31 capable of pressing the right and left rear end parts of the cutter 13, and oil pressure chambers 34 respectively communicating with the oil supply pipes 33. Oil is supplied to the oil pressure chambers 34 communicating with the oil supply pipes 33 when cutting each sealed part 16. When the piston rod 31 is advanced with the force greater than the biasing force, the cutter 13 is pressed to cut the laterally sealed part 16 of the packaging material web 15. After the sealed part 16 is cut, the supply of oil from the oil supply pipe 33 is stopped so that oil pressure in the oil pressure chamber 34 becomes 0 (zero), wherein the cutter 13 is retreated again with reliability by the biasing force of the pneumatic cylinder 20 when the oil under pressure is not applied.

A pressure sensor 27 is attached to an air supply passage 26 extending to the air supply pipe 24 for detecting the change of pressure in the air supply passage 26 so that the change of pressure in the pressure chamber 25 is always monitored, and the machine is stopped when detecting an anomaly such as disconnection of the pipes. The oil supply pipe 33 connecting to the oil pressure chamber 34 is connected to an operating oil pipe, not shown.

Next, the lateral sealing and cutting process will be now described. While the swing arms 3 and 4 pivotally move from the open position to the closing potion, the movable engaging member 9 remains in an upward position slightly inclined upward forward from the position crossing right angles with respect to the swing arms 3 and 4. When the swing arms 3 and 4 reach in the vicinity of the closed position, the movable engaging member 9 turns to change its position from the upward position to the horizontal position so that the tip end of the movable engaging member 9 is engaged with the stationary engaging member 8. When the movable engaging member 9 is engaged with the stationary engaging member 8 to draw each other, the seal bars 5 and 6 to which the stationary and movable engaging members 8 and 9 are fixed also draw each other to produce the sealing pressure between the seal bars 5 and 6. As a result, the seal bars 5 and 6 lower together with the movable frame 2 while they press the tube 17 and the tube 17 is fed downwardly by the length each corresponding to one container to complete the lateral sealing.

When the movable frame 2 reaches the lower limit position, oil as operating fluid is supplied from the oil supply pipe 33 to the oil pressure chamber 34 of the hydraulic cylinder 30 to advance the piston rod 31 with a force which is greater than the biasing force by the pneumatic cylinder 20 so that the right and left end parts of the cutter 13 are pressed to cut each laterally sealed part 16 of the packaging material web 15.

Next, when the supply of the oil as operating fluid from the oil supply pipe 33 to the oil pressure chamber 34 is stopped, thereby generating no oil pressure before the swing arms 3 and 4 pivotally move from the closed position to the open position, the cutter 13 is retreated because air is always supplied from the air supply pipe 24 to the pressure chamber 25 of the pneumatic cylinder 20 to always apply the biasing force so as to retreat the piston rod 21 via the piston 23. Successively, the similar operations are repeated.

In the above embodiment, although air is used as a pressure medium for always applying biasing force in a direction to retreat the piston rod 21, other pressure media such as oil, water, etc. may be used instead of air.

Further, although there has been explained in the above embodiment for the filling and packing apparatus of the type where the lateral sealing process and the cutting process are performed in the lateral sealing apparatus, the present invention for retreating the piston rod to which the cutter is attached by hydraulic cylinder can be applied to a superhigh-speed filling and packing apparatus of the type capable of producing 8,000 containers per hour where a lateral sealing apparatus and a cutting apparatus are separated from each other. In this case, the high-speed cutting can be more smoothly performed.

According to the present invention, the cutting operation in the lateral sealing process in the filling and packing apparatus can be secured for an extended period of time by utilizing fluid pressure such as air instead of springs as a means for giving biasing force in a direction to retreat the piston rod to which the cutter is attached in the cutting device having the complex construction of this type. As a result, the troublesome replacement of the springs can be omitted with less running cost compared with the cutter employing the springs.

Further, since the spring has a spring constant and the spring force during the operation is not constant, the cutting can be smoothly performed and the noise generated during the cutting can be reduced when utilizing the fluid pressure for advancing and retreating the cutter.

Still further, since the tip end of the cuter to be accommodated in the cutter accommodation part of the seal bar always protrudes from the cutting bar when the spring is broken, the energy from the inductor of another seal bar is taken out by the protruding cutter so that the heating of the aluminum foil of the packing material web is insufficient. As a result, there is no likelihood that the resin layer is insufficiently molten to make the lateral sealing insufficient.

More still further, according to the present invention, since the pressure sensor is provided on the air supply passage for always monitoring the change of pressure, an anomaly can be instantaneously detected when such anomaly such as disconnection of pipes occurs, thereby stopping the operation of the filling and packing apparatus to minimize the manufacture of the product having inferior cutting and inferior sealing.

What is claimed is:

1. A cutting device for a tubular packaging material web which is filled with a fluid, said cutting device comprising a pair of seal bars for laterally sealing the packaging material web, a cutter for cutting the packaging material web at sealed parts thereof having a pneumatic cylinder providing a biasing force on the cutter in a direction to retract the cutter, and a hydraulic cylinder providing a biasing force on the cutter in a direction to advance the cutter.

2. The cutting device according to claim 1, wherein the cutter is provided in one of the seal bars to be freely advanced toward or retracted from the seal bars.

3. The cutting device according to claim 1, further including a pressure sensor provided on an air supply passage of the pneumatic cylinder for detecting pressure change.

4. A filling and packaging apparatus provided with the cutting device according to claim 3.

5. The cutting device according to claim 1, wherein the seal bars move vertically alternately.

6. A filling and packaging apparatus provided with the cutting device according to claim 5.

7. A cutting device for a tubular packaging material web which is filled with a fluid, said cutting device comprising:

a pair of seal bars for laterally sealing the packaging material web, a cutter provided in one of the seal bars to be freely advanced toward or retracted from the seal bars for cutting the packaging material web at sealed parts thereof to have a length corresponding to one container;

a retraction piston disposed rearwardly of the cutter and integrated with a retraction piston rod mounted on a central rear end part of the cutter for providing a biasing force to the cutter in a direction to retract the cutter;

a pneumatic cylinder having a pressure chamber housing the retraction piston therein, the pressure chamber communicating with an air supply pipe;

advancement pistons at a back side of the cutter and arranged at opposite sides of the pneumatic cylinder, and integrated with advancement piston rods for pressing opposite rear ends of the cutter for providing a biasing force to the cutter in a direction to advance the cutter;

hydraulic cylinders each having an oil pressure chamber having one of the advancement pistons therein, the hydraulic cylinders communicating with an oil supply pipe; and a pressure sensor for detecting a change of pressure in a passage for supplying air to the air supply pipe.

8. The cutting device according to claim 7, further including a pressure sensor provided on an air supply passage of the pneumatic cylinder for detecting pressure change.

9. The cutting device according to claim 7, wherein the seal bars move vertically alternately.

* * * * *